SOUND ANALYZING SYSTEM

Filed Aug. 29, 1960 4 Sheets-Sheet 1

INVENTOR.
WILLIAM C. DERSCH

BY FRASER AND BOGUCKI

ATTORNEYS

*INVENTOR.*
WILLIAM C. DERSCH

*BY* FRASER AND BOGUCKI

ATTORNEYS

*INVENTOR.*
WILLIAM C. DERSCH

*BY* FRASER AND BOGUCKI

ATTORNEYS

INVENTOR.
WILLIAM C. DERSCH
BY FRASER AND BOGUCKI
ATTORNEYS

United States Patent Office 3,198,884

Patented Aug. 3, 1965

3,198,884

SOUND ANALYZING SYSTEM

William C. Dersch, Los Gatos, Calif., assignor to International Business Machines Corporation, New York, N.Y., a corporation of New York Filed Aug. 29, 1960, Ser. No. 52,548
20 Claims. (Cl. 179—1)

This invention relates to systems for the analysis and identification of sound, and more particularly to a system for recognizing spoken words.

A machine capable of recognizing spoken words has wide-spread application in communications, data processing and industry. A telephone switching system, for example, might be operated by spoken instead of dialed commands, while for other purposes words and numbers might be recorded directly in printed form, through the use of the recognition machine to control a printing device. The slowest aspect of modern high speed data processing systems is the preparation of data in a form suitable for entry into the data processing system. With a number of business transactions, for example, individual punched cards are often prepared for each transaction, and fed into the machine to be processed. In most of such applications speed would be considerably improved if a reliable speech recognition machine were available to convert spoken words directly into a coded form suitable for entering into the data processing system.

While the present invention is particularly concerned with the difficult problem of speech recognition, it has other aspects which are of widespread application. An ability reliably to distinguish particular characteristic sounds may well be of equal significance to an ability to recognize speech. It is well known, for example, that a person with experience can hear and identify meaningful sound patterns which cannot be distinguished by others. A simple example is the automobile mechanic who is able to identify mechanical difficulties in an engine by listening to the engine in operation. Another example is the sonar operator who is able to distinguish useful echoes from similar but spurious sounds. While it is known that much information can be derived by analysis of a visual display of the time varying characteristic of the sound, this type of display often does not show many types of sound variations which are present. For that matter, much information which is contained in sounds may not be distinguished by even the best trained and most acute observer. A physician who listens to certain heart sounds may be able to distinguish some patterns by ear, and may also be able to distinguish other patterns through use of an oscilloscope display of the same sounds. Much additional information of a more subtle nature may be lost, however, through inability fully to analyze the nature of the sounds themselves.

The problems involved in full analysis and appreciation of the nature of sounds are nevertheless greatest in speech recognition work. Human speech varies with the person, emotional conditions, and with the context in which a word may be uttered. When different speakers pronounce the same word, the human ear and mind readily distinguish differences in amplitude or loudness, frequency or pitch, tone, intonation and inflection. Such deviations from the standard appear to a speech recognition machine as noise, however, and greatly complicate the problems of recognition.

Some discussion is appropriate at this point of the characteristics which electrical signals may have when they represent speech. Such signals may, of course, be generated by the pressure waves of speech acting upon a microphone. The electrical signal representation of speech, rather than acoustic waves, are primary objects of concern hereafter in this specification. The electrical signals may represent various types of spoken sounds, including sounds which originate predominantly in the vocal cords and are here called "voiced" sounds or "voicing" and other sounds which are formed from constricted passage of air and are here called "frictional" or "non-voicing" sounds. Careful note should be taken of the fact that the characteristics of voicing and frictional sounds, and the signals by which they are represented, are not restricted to any particular relationship to phonetic syllables, phonemes or other language or word analysis units.

Attempts which have heretofore been made to simulate or imitate the functioning of the human ear and mind in recognizing spoken words have encountered certain basic difficulties. Many systems have attempted to treat words as a whole, and to establish and identify a significant time varying signal pattern for each word to be recognized. It has been found, however, that this type of representation does not sufficiently preserve the more complex variations and does not uniquely identify different words with sufficient clarity. Accordingly, more extensive systems have been developed, based primarily upon frequency selective and sensitive techniques which permit a closer analysis of the sound energy of the spoken word. Even though these systems are sometimes extremely large and complicated, however, they are still limited in vocabulary, accuracy and reliability.

Particularly difficult problems are created in speech recognition work by variations in speech rate and word lengths. One person might speak a short word over a longer interval than another person speaks an extremely long word. Designers of speech recognition machines have recognized these problems and have attempted to overcome them by a number of expedients. Practically all of these expedients have, however, utilized some sort of arbitrary time base or "synchronous" analysis technique. The time duration of the signals corresponding to the spoken words to be recognized may be "normalized" to a specific value in some systems. Such a procedure does make more uniform the representation of a specific word emanating from different sources, but also materially increases the likelihood of confusion of that word with other spoken words. Other systems, to overcome the problems of variable word length and variable speech rate, have incrementally divided the duration of signals representative of a word into separate time segments, and have analyzed different characteristics within each of these time segments. Whether done with or without normalization, however, the use of such a synchronous analysis becomes extremely complicated and expensive with even a small machine vocabulary.

Needless to say, reliability and accuracy are primary requirements of speech recognition systems. A speech recognition machine must be relatively simple because otherwise its cost of construction and operation could not be justified by comparison with human operators. To operate in practical situations, a reasonable vocabulary must be accurately identified even though different speakers provide the input signals, and even though the speakers are likely to use careless and faulty enunciation. Some of the other practical problems which must be overcome include the following. The machine must be able to distinguish a given sequence of words, even though several words may be pronounced virtually as one by an operator. Dropping, slurring or emphasis of particular syllables because of regional accents, individual habits or usage of a word in a sentence should not within reasonable limits materially affect the reliability with which the word is identified. The machine must be capable of adjustment to enunciation if such is needed. The machine should be relatively simply mechanized for a small vocabulary, but be enlargeable on a systematic basis for a greater vocabulary. The circuitry and other equipment which are used should be simple and sensitive but stable and free from the need of precise regulating circuits.

It is therefore an object of the present invention to provide novel systems and methods for analyzing sound.

Another object of the invention is to provide novel systems and methods for identifying spoken words.

Another object of the present invention is to provide a novel method for analyzing unique properties and characteristics of sound energy.

A further object of the present invention is to provide methods and systems for automatically distinguishing individual ones of a large number of spoken words.

A further object of the present invention is to provide a speech recognition system having a high reliability in recognizing individual spoken words out of a large vocabulary of spoken words, and to tolerate reasonable individual variations in amplitude, speech rate, pitch, intonation and inflection.

A further object of the present invention is to provide improved sound analyzing systems and methods capable of more completely characterizing and more accurately measuring the characteristics of sound energy than systems and methods heretofore available.

Systems in accordance with the present invention have a number of different aspects, and represent a novel approach to the problems of sound analysis and speech recognition. In a broad sense, the systems and methods of the present invention use a digital analysis of the electrical signals representative of sound in which digital values are established by measurements which determine the occurrence or nonoccurrence of certain highly specific "machine syllables" and spoken sound increments. The machine syllables are not divided in accordance with the syllables of the spoken words, but are directly related to a time base which is established by the machine itself in response to time varying characteristics of electrical signals corresponding to the spoken word. By making different and highly precise measurements for specific characteristics during the interval of a spoken word, logically related sequences of spoken sound increments are established which uniquely identify individual spoken words in the selected vocabulary.

One aspect of systems and methods in accordance with the present invention is that particular sounds themselves are not identified by a simulation of the human hearing process, but that from the signals representative of speech, different speech or sound increments are identified by electronic means which are sensitively responsive to characteristics which may or may not be perceptible. The use of independent measurements having cumulative significance in sound analysis contributes to the attainment of both high reliability and a large capacity.

Other important considerations which add to system capability are the "machine syllable" and the "asynchronous time base" which are used. In a specific example of a system in accordance with the invention, the reference for the asynchronous time base is provided by the detection in the electrical signals of the initiation of voicing sounds, those emanating from excitation of the vocal cords, as distinguished from mechanically originated and random sounds. The presence of voicing characteristics is identified by measurement of selected characteristics with high precision. Concurrently, the system utilizes other detectors which distinguish the existence of signals generated by certain types of weak and strong frictional sounds, and which also distinguish between signals resulting from different types of vowel sounds. The placement of the various sound representations in time relative to the occurrence of the initiation of voicing establishes a number of conditions which provide the necessary and sufficient identification of each individual word of the selected vocabulary.

More specifically, a system in accordance with the present invention recognizes the ten spoken digits from "zero" to "nine" by using concurrent measurements of the electrical signals to identify voicing, two different frictional sound characteristics, and three different vowel characteristics. The frictional characteristics which are detected may be characterized as strong frictional and weak frictional sounds, while the three vowel measurements which are made may uniquely distinguish the "one" from the "nine," the "three" from the "four," and "two" from the "seven" vowel sounds. Signals provided from the various measurement circuits are utilized to control word selection circuits which establish digital conditions in accordance with the specific sound measurements and the time sequence in which they were made. In this connection, the occurrence of voicing serves as the time reference, and the system "looks" both forward and back in time to determine the relative placement of other sounds. Thus, the word selection circuits may indicate that, along with a single voicing sound, a strong frictional sound occurred in the initial part of the spoken word and a strong frictional sound also occurred at the termination of the spoken word. These logical relationships thus uniquely identify a selected one, the "six," out of the ten spoken digits.

Methods in accordance with the present invention utilize independent concurrent measurements of signal representations of frictional and vowel sound characteristics to identify machine syllables and to place them in time relative to each other. The machine syllables are not determined by spoken syllables but are consistent with the information content of the words. Detection of the selected sound characteristics is controlled by the speech itself, so that no artificial time base need be used.

A better understanding of the invention may be had by reference to the following description, taken in conjunction with the accompanying drawings, in which.

The system which is shown by way of example is for the recognition of speech. For a better understanding of how systems and methods in accordance with the invention apply to speech recognition, some appreciation should be had of particular characteristics of speech. Many speech sounds may be characterized as "voicing." Voicing sounds are defined here as sounds which emanate from or originate in the vocal cords with vibration of the vocal cords because of passage of air through them. This is not equivalent to "voicing" in musical terminology, where the term is concerned primarily with tonality. Voicing has particular characteristics which are carried into the resultant electrical signals and may be distinguished by circuits used in the systems and methods here described. One of these characteristics is a waveform having asymmetric features. Voiced utterances give rise to electrical signals which have power peaks which are asymmetrically distributed relative to their reference axis, as contrasted to a sine wave, in which the power peaks are symmetrically distributed about the reference axis. Further, the wave represented by sound has a complex character and may be considered to be periodic during production of a voiced sound.

Other sounds used in speech may be classified as frictional (or fricative) sounds. The frictional sounds result when the tongue, teeth or lips are formed into a construction through which air is passed. The frictional sounds may further be subdivided into the strong frictional sounds, such as the "*s*," hard "*t*" and "*x*" sounds, and the weak frictional sounds, such as the "*f*," "*v*" and soft "*t*" sounds. The "*n*" and "*m*" sounds are here treated as "machine vowel" sounds, for reasons which are described in more detail below. The "*z*" sound has both types of characteristics mentioned and may be regarded as having voiced friction.

Figure 1:
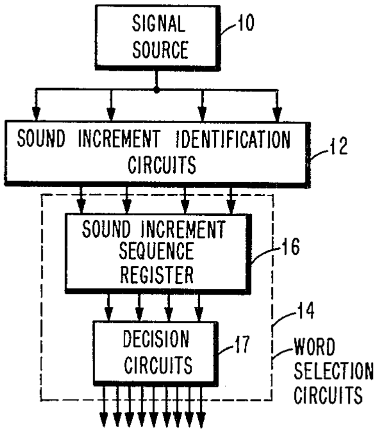
FIG. 1 is a block diagram representation of a general identification system in accordance with the invention.

The principal elements of a system in accordance with the invention are shown in FIG. 1. Electrical signals representative of spoken words are provided from a signal source 10 to identification circuits 12 which distinguish signals representing particular spoken sound increments or events. These spoken sound increments are identified by particular recognizable properties of the electrical signal waveform representing a spoken word, such as different types of voicing and frictional sound representations. It should be borne in mind, however, that inasmuch as various measurements which are made deal with different characteristics, the spoken sound increments are not of any specific length, but are successive in character, and do not overlap. Different properties of a waveform may, however, identify a single sound increment.

Signals provided from the identification circuits 12 are applied to word selection circuits 14 which perform the dual functions of determining the time relationship of the different sound increments, and making the logical decisions which determine particular words from different combinations of the sound increments. Here the word selection circuits 14 consist of two principal functional units, one of which is a sound increment sequence register 16, and the other of which consists of decision circuits 17. Both of the units employed in the word selection circuits 14 may utilize relay elements, transistor or diode elements, or electron tube devices to perform the signal storage and controlled switching which are desired. In accordance with well known concepts of system design, the operating elements employed in these circuits may include bistable storage elements, "AND" and "OR" gates and various other circuits commonly used in digital data processing. Particular forms using relay circuits are described in conjunction with FIGS. 3 and 4 below.

In the operation of the system of FIG. 1, each spoken word in the vocabulary causes the detection by the sound increment identification circuits 12 of a sufficient number of different specific characteristics in the corresponding signals. As a simple illustration, if it is assumed that one word in the vocabulary contains a characteristic which is uniquely identifiable, then a detector circuit which is responsive only to that unique characteristic definitely identifies the occurrence of that spoken word in the vocabulary. As a more complex example, but still a relatively simple one, only one word in the vocabulary may initiate and terminate with strong frictional sounds. When the sound increment sequence register 16 indicates to the decision circuits 17 that this condition obtains, a signal which denotes the occurrence of the given spoken word may be provided from the decision circuit 17. The sound increments which are detected are not materially affected by speech rate or other factors. The times at which the sound increments are detected are related only to the word itself which thus serves to define an arbitrary or asychronous time base for the machine.

With this arrangement, the machine syllable is identified, in speech recognition systems, by the initiation of voicing. Word structure is not controlling as to machine syllables, although the time varying sound patterns are controlling.

Systems and methods which analyze sounds in accordance with the invention provide noteworthy advantages. The system may be relatively simple, because by establishing its own asynchronous time base it is freed from all requirements for the analysis of speech rate or signal normalization. Thus registration of signals representing a word, with some fixed time base in order to compare to a standard, is not necessary. The machine syllable provides an effective bridge of the gap between meaningful segments of the spoken word and simple circuit mechanizations which can be made to respond with precision to specific characteristics of the spoken word. It permits automatic segmentation of sounds in accordance with meaningful changes in the sounds.

Figure 2:
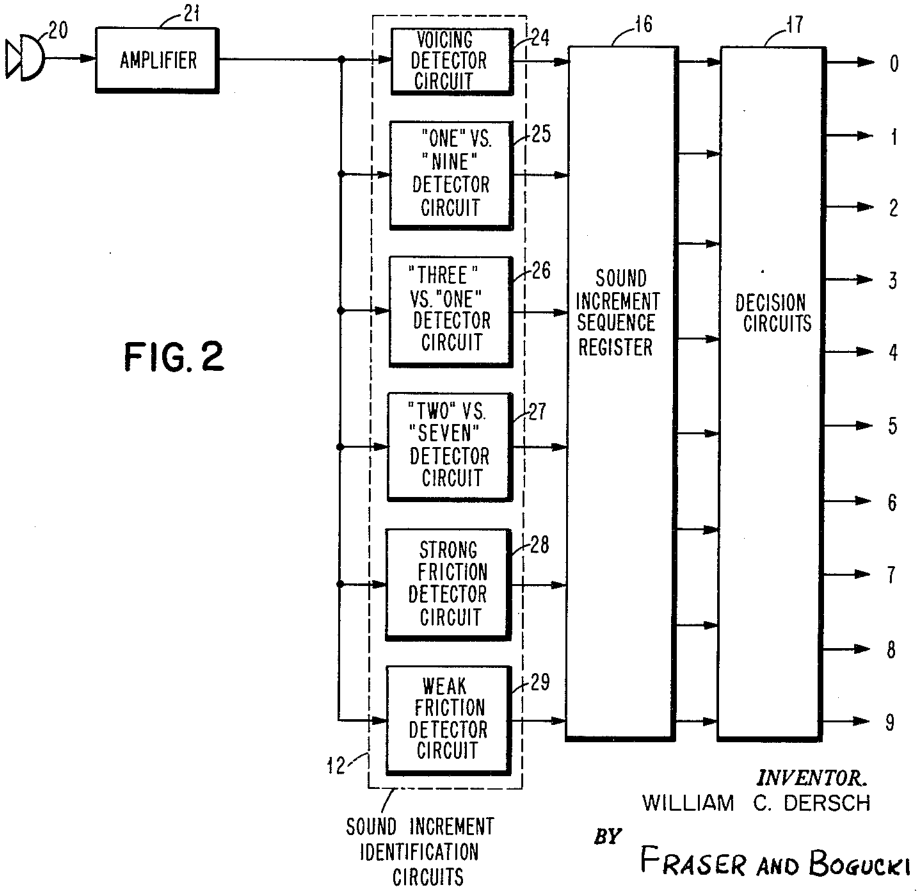
FIG. 2 is a block diagram of a system in accordance with the invention for recognizing ten spoken digits, which system includes a sound sequence register, decision circuits, a voicing detector, frictional sound detectors and vowel detectors.

A very compact and inexpensive but nonetheless practical illustration of a system in accordance with the present invention is given by the system for recognizing the spoken digits from "zero" to "nine" which is shown in FIG. 2. With this system, the source of electrical signals representative of words spoken by a person is a microphone 20 and a coupled amplifier 21. The sound increment identification circuits 12 consist, for this example, of six different detector circuits 24–29, each of which is coupled to receive signals from the amplifier 21 concurrently with the others. A voicing detector circuit 24 provides a significant and principal function in the arrangement shown. The voicing detector circuit 24 is, in this arrangement, responsive to the asymmetric characteristic which characterizes voiced human speech only, and provides an output signal whenever such asymmetric characteristic is present.

Each of the next three detector circuits 25–27 is responsive to a specific different vowel characteristic which is retained in the electrical signals. A "one" vs. "nine" detector circuit 25 provides an output signal when the vowel sound of the "one" is present, but not when the "nine" is provided. Similarly, a "three" vs. "four" detector circuit 26 distinguishes the vowel sound of the "three" from that of the "four" by providing a signal on the occurrence of a "four." A "two" vs. "seven" detector circuit 27 distinguishes the "two" from the "seven" by indicating only the "seven." Full identification of each of these digits is dependent upon the identification of other spoken sound increments, but the identification of these vowel characteristics provides the final measurement needed for the present system.

The remaining two detector circuits 28 and 29 in the sound increment identification circuits 12 are a strong friction detector circuit 28 and a weak friction detector circuit 29. Although in the present instance the weak friction detector circuit 29 is also responsive to the signal representations of strong frictional sounds, the incremental sound sequence register 16 is arranged to provide the necessary separation of strong frictional from weak frictional sounds. Although this separation is accomplished by a gating action it may also be accomplished by other techniques such as signal subtraction.

Figure 3:
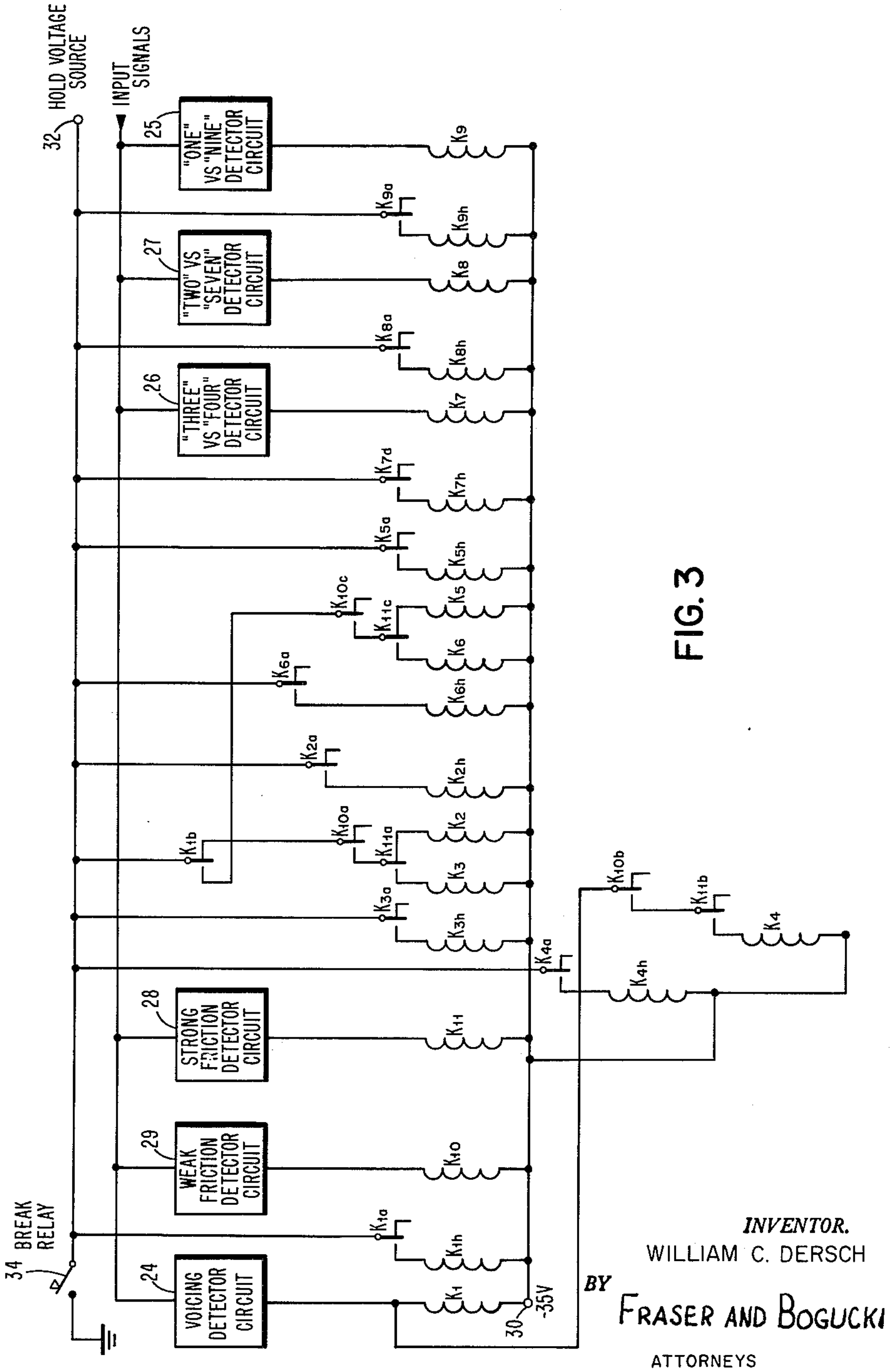
FIG. 3 is a schematic diagram of a typical sound sequence register which may be employed in the arrangement of FIG. 2.
Figure 4:
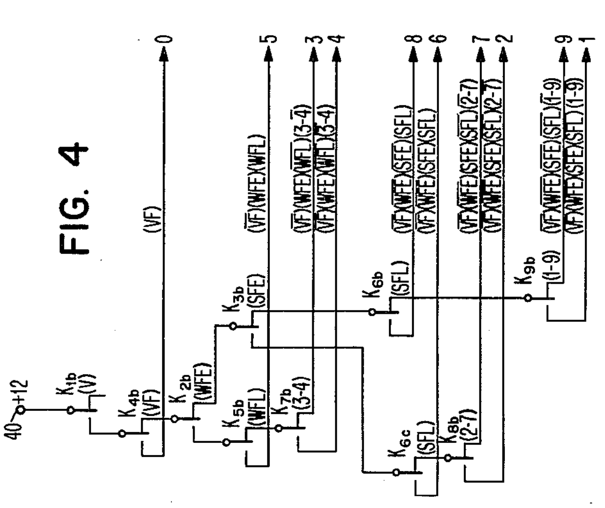
FIG. 4 is a schematic diagram of decision circuits which may be employed in the arrangement of FIG. 2.

The incremental sound sequence register 16 and the decision circuit 17 which are employed in the spoken digit recognizer system are shown in FIGS. 3 and 4 respectively. The various detector circuits 24–29 of FIG. 2 are included in FIG. 3 in order to clarify the representation. Input signals are provided to one terminal of each of the detector circuits 24–29, and the opposite terminals of the detector circuits 24–29 are coupled through the coils of relays to a negative potential source 30 which is here a —35 volt source.

The relay circuits which are used include hold relay coils, and may include a number of armatures for each relay element. Accordingly, the following notation has been adopted. The designation $K_1$ denotes the "seize" or activate coil of the first relay, while the notation $K_{1h}$ denotes the hold coil of the first relay. The various armatures of the relay are each assumed to be single-pole, double-throw types, and are designated successively as $K_{1a}$, $K_{1b}$, and so forth. Once an identification of a spoken word has been made, completed circuits between the hold relay coils and the hold voltage source 32 are disconnected by a reset or break relay 34. The break relay 34 grounds the circuits, deenergizing the hold coils to terminate the hold operation. Although the break relay 34 is shown as manually operated, it may as well be a different type of switching device, or automatically operated, as by a time delay means following the identification of a word, or by the initiation of the voicing signal for the next word to be identified. All of the relay armatures are shown in the positions which they normally occupy prior to actuation during system operation.

Similar hold circuit arrangements are used at a number of points. In conjunction with the voicing detector circuit 24, for example, the $K_1$ relay coil, when actuated, closes a hold circuit including a series combination of an armature $K_1$ and a hold relay coil $K_{1h}$. Like arrangements are provided at the "three" vs. "four" detector circuit 26, the "two" vs. "seven" detector circuit 27 and the "one" vs. "nine" detector circuit 25, with relay coils $K_7$, $K_8$ and $K_9$ respectively. The strong friction detector circuit 28 and the weak friction detector circuit 29, however, control relay coils $K_{11}$ and $K_{10}$ respectively which are coupled in an interrelated fashion to the remainder of the circuits. Inasmuch as actuation of the relay coils $K_1$ through $K_9$ corresponds to registry of particular sound increments and in some cases to the registry of the timing relationship of particular sound increments to the selected time base, the use and significance of individual circuits may most readily be understood when referred to the various sound increments and timing relationships which are utilized.

The significance of the operation of each of the relay coils $K_1$ through $K_9$ may be summarized in the following fashion:

$K_1$=(*V*)=Voicing
$K_2$=(*WFE*)=Weak friction early
$K_3$=(*SFE*)=Strong friction early
$K_4$=(*VF*)=Voicing and friction
$K_5$=(*WFL*)=Weak friction late
$K_6$=(*SFL*)=Strong friction late
$K_7$=(3–4)="three" vs. "four" decision
$K_8$=(2–7)="two" vs. "seven" decision
$K_9$=(1–9)="one" vs. "nine" decision The above table represents the different sound increment and time determinations made by the system, which are related to the circuit of FIG. 3 as follows:

*Voicing.*—The signal provided from the voicing detector circuit 24 energizes the relay coil $K_1$ to indicate that voicing is present.

*Weak friction early.*—The application of a weak friction signal actuates the weak friction detector circuit 29 but does not actuate the strong friction detector circuit 28. Relay coil $K_{10}$ is therefore energized whereas relay coil $K_{11}$ is not. In this instance armatures $K_{1b}$ and $K_{11a}$ maintain their normal positions but armature $K_{10a}$ switches to provide a complete circuit from the hold voltage source 32 through relay coil $K_2$. Thereafter this circuit is held by operation of the hold coil $K_{2h}$ in circuit with the armature $K_{2a}$. This satisfies the condition that a weak frictional sound precedes the voicing sound.

*Strong friction early.*—A strong frictional sound actuates both the strong friction detector circuit 28 and the weak friction detector circuit 29, operating the associated relay coils $K_{11}$ and $K_{10}$ respectively. In this instance the voicing detector circuit 24 has not at this point in time switched the armature $K_{1b}$, but the armatures $K_{10a}$ and $K_{11a}$ are switched to their alternate positions, completing a circuit through the relay coil $K_3$ which is then maintained by the associated hold circuit. Where a word is pronounced with a weak frictional sound preceding a strong frictional sound (as sometimes happens with an initial letter "s") the strong frictional sound controls.

*Voicing and friction.*—In the situation in which strong friction is detected by the strong friction detector circuit 28 and the weak friction detector circuit 29 concurrently with the detection of voicing by the voicing detector circuit 24 a complete circuit exists through the armatures $K_{10b}$ and $K_{11b}$ and the relay coil $K_4$. Once actuated, the $K_4$ relay circuit is held by an associated hold circuit in the fashion previously described. It should be noted, however, that it is the transistory signal from the voicing detector circuit 24 which actuates relay coil $K_4$, and not the steady signal provided when the hold relay coil $K_{1h}$ is actuated.

*Weak friction late.*—Where the voicing detector circuit 24 has been actuated and the weak friction detector circuit 29 is then actuated without operation of the strong friction detector 28, a complete circuit path exists between the hold voltage source 32 and the relay coil $K_5$. This circuit path is completed through the armatures $K_{1b}$ and $K_{10c}$ which are switched to their alternate positions, and the armature $K_{11c}$ which is maintained in its normal position. The hold circuit is again operated to provide a steady indication.

*Strong friction late.*—When the strong friction detector circuit 28 is actuated along with the weak friction detector circuit 29 following response of the voicing detector circuit 24 to voicing, the conditions are the same as with the identification of weak friction late, except that the armature $K_{11c}$ is switched from its normal position into circuit with the relay coil $K_6$. Energization of relay coil $K_6$ therefore identifies strong friction late, and this identification is maintained by the associated hold circuit.

*(3–4) Detection.*—The provision of an output signal from "three" vs. "four" detector circuit 26 in response to input signals energizes relay coil $K_7$ and the associated hold circuit.

*(2–7) Detection.*—Relay coil $K_8$ is actuated by output signals from the "two" vs. "seven" detector circuit 27 in response to the occurrence of appropriate characteristics in the input signals. A hold circuit is again actuated to indicate this condition.

*(1–9) Detection.*—A relay coil $K_9$ is actuated, and in turn actuates a hold circuit $K_{9a}$ and $K_{9h}$ in a manner similar to the two detection and hold circuits previously described.

*Interlock control for strong and weak friction signals.*—As previously described, the weak friction detector circuit 29 responds to strong friction signals as well as weak friction signals. To separate strong friction from weak friction signals, the strong friction detector circuit 28 is used for control purposes as a gate to govern the manner in which signals generated in response to operation of the weak friction detector circuit 29 are used. With the relay circuits shown, this gating action is accomplished by utilizing an armature of the relay $K_{11}$ in series with each armature of the relay $K_{10}$. For example, the armatures $K_{10a}$ and $K_{11a}$, and the armatures $K_{10b}$ and $K_{11b}$ are paired together in series coupling. Those skilled in the art will recognize that these arrangements may be varied in accordance with the particular detector circuits which are used, and the types of frictional sounds to which they are responsive.

Examination of the arrangement of FIG. 3 will reveal that a part of the decision making function is performed by the circuits of FIG. 3. This includes the generation of certain signals in response to concurrent conditions, such as initiation of the VF signal upon substantially simultaneous actuation of the voicing detector circuit 24, the weak friction detector circuit 29 and the strong friction detector circuit 28. It includes also, of course, identification of the time sequences of signals, such as the weak friction early and strong friction late conditions. In the present system, however, the principal decision making function is reserved for the decision circuit 17 which is shown in detail in FIG. 4.

The decision circuit 17 is a relay pyramid which effectively "recognizes" certain logical equations, which may be set down as follows, utilizing the logical notation (VF, WFE, and so forth) which was previously established. The decisions which are made may be expressed as follows:

"zero" $=\mathrm{VF}$
"one" $=(\overline{\mathrm{VF}})\ (\overline{\mathrm{WFE}})\ (\overline{\mathrm{SFE}})\ (\overline{\mathrm{SFL}})\ (1\text{–}\bar{9})$
"two" $=(\overline{\mathrm{VF}})\ (\overline{\mathrm{WFE}})\ (\mathrm{SFE})\ (\overline{\mathrm{SFL}})\ (2\text{–}\bar{7})$
"three" $=(\overline{\mathrm{VF}})\ (\mathrm{WFE})\ (\overline{\mathrm{WFL}})\ (3\text{–}\bar{4})$
"four" $=(\overline{\mathrm{VF}})\ (\mathrm{WFE})\ (\overline{\mathrm{WFL}})\ (\bar{3}\text{–}4)$
"five" $=(\overline{\mathrm{VF}})\ (\mathrm{WFE})\ (\mathrm{WFL})$
"six" $=(\overline{\mathrm{VF}})\ (\overline{\mathrm{WFE}})\ (\mathrm{SFE})\ (\mathrm{SFL})$
"seven" $=(\overline{\mathrm{VF}})\ (\overline{\mathrm{WFE}})\ (\mathrm{SFE})\ (\overline{\mathrm{SFL}})\ (\bar{2}\text{–}7)$
"eight" $=(\overline{\mathrm{VF}})\ (\overline{\mathrm{WFE}})\ (\overline{\mathrm{SFE}})\ (\mathrm{SFL})$
"nine" $=(\overline{\mathrm{VF}})\ (\overline{\mathrm{WFE}})\ (\overline{\mathrm{SFE}})\ (\overline{\mathrm{SFL}})\ (\bar{1}\text{–}9)$ The manner in which each of these logical conditions is satisfied by the relay pyramid of FIG. 4 is set out in detail below in conjunction with the description of how each spoken digit from "zero" to "nine" is recognized. The form of word analysis which is undertaken, however, is markedly different from the analytical approaches used by prior art systems. In utilizing this form of word analysis to identify spoken words, it should be recognized that greatest flexibility will be attained by recognizing that the spoken sound increments and the machine syllables represent different types of information than that conventionally employed, and that they must be differently treated. Exploitation of the full possibilities of this type of analysis requires freedom from adherence to phonetic syllables, phenomenes and conventional letter groupings.

With the ten spoken digits as the desired vobaculary, for example, identification of each of the digits is possible even though each is regarded as having only a single machine syllable. To repeat, a machine syllable is defined as a transition to voicing from no sound or a frictional sound. With this approach, the second phonetic syllable, as contrasted to machine syllable, of the digits "seven" and "zero" need not be utilized, because the "ven" and "ro" sounds appear as machine vowel sounds. Now the single machine vowel sounds which these spoken digits contain may or may not initiate and terminate with different types of frictional sounds. The vowel sounds themselves may vary in different ways. The sound increments which characterize the single machine vowel sounds of each of the ten spoken digits are here employed for two purposes. One of these purposes is to serve as the reference for a time base to which the earlier and later sounds of the digit may be related, and the other purpose is to serve as a basis for further characterization of sounds. The first purpose may in turn be seen to involve two functions, these being the provision of a registration point, and the accomplishment of segmentation of the time varying sound sequence of the spoken word. The existence of a registration point means that the existence of a spoken word (as compared to noise or a random signal) has been vertified, even though the beginning and ending of the spoken word in time may be relatively indeterminate.

The discernible speech characteristics which are presented to the detector circuits 24–29 in FIGS. 2 and 3 are distributed among the ten spoken digits as set out below:

Voiced Friction (VF) is present only in the "z" sound of the spoken "zero" digit.

Voicing (V) is present in all the spoken digits, but is found alone only in the "one" and "nine" digits. The "n" sounds are treated as having vowel characteristics for the purposes of this machine.

Strong Friction Early (SFE) is found in the "t" and "s" sounds of the "two," "six" and "seven" spoken digits. The "t" in "two" is roughly similar to a short sample of the "s" sound.

Weak Friction Early (WFE) is presented by the "th" sound of the "three," the "f" sound of the "four" and the "f" sound of the "five."

Weak Friction Late (WFL) is presented by the "v" sound of the "five" spoken digit. The "r" sounds contained in the "three" and "four" again have vowel characteristics for present purposes.

Strong Friction Late (SFL) occurs in the terminating strong frictional sounds in the "x" portion of the spoken digit "six" and the "t" portion of the spoken digit "eight."

The general manner of operation of the relay pyramid of FIG. 4 is that the various relay armatures are operated substantially independently of each other in time, but under control of the spoken word itself, and that a fixed indication is given for only the recognized spoken digit. The following tabulation gives the various spoken digit sounds, and relates the characteristics of these sounds to the manner in which the relay pyramid of FIG. 4 is operated under the control of the sound increment sequence register 16 of FIG. 3 and the sound increment identification circuits 12 of FIGS. 2 and 3.

*"Zero."*—The VF condition indicates simultaneous detection of a strong frictional sound and voicing, which is present only when the "zero" of the chosen vocabulary is pronounced. Brief observation will affirm that the "z" sound is formed both at the vocal cords and the lips and teeth of the speaker. In FIG. 4, a circuit path is completed between the positive voltage source 40, the switched armature $K_{1b}$ of the $K_1$ relay coil and the armature $K_{4b}$ of the $K_4$ relay coil which indicates the VF condition. In its normal position, the armature $K_{4b}$ is in circuit with all of the remaining circuit elements of the relay pyramid. Output signals provided on the "O" line are the output signals from the system, and may be utilized to flash lights, control a printing device or for other purposes.

*"One" and "nine."*—The "n" sounds which are present in the "one" and the "nine" spoken digits are not, for present purposes, frictional sounds but are a special type of vowel sound. Accordingly, these spoken digits are characterized by voicing alone, so that they both include the logical condition $(\overline{\mathrm{VF}})\ (\overline{\mathrm{WFE}})\ (\overline{\mathrm{SFE}})\ (\overline{\mathrm{SFL}})$, which is established by the relay armatures $K_{4b}$, $K_{2b}$, $K_{3b}$ and $K_{6b}$ remaining in their normal positions. The "one" vs. "nine" detector circuit 25 of FIG. 3 switches the relay armature $K_{9b}$ in response to the detection of characteristics of a spoken "one" digit, so that the "nine" condition is conversely indicated when the armature $K_{9b}$ remains in its normal position.

*"Two" vs. "seven" decision.*—The "two" and "seven" sounds are both characterized by early strong frictional sounds, and by the absence of later strong frictional sounds. The "ven" sounds in the "seven" do not, with the present detector circuits, present frictional characteristics. Accordingly, both the sounds satisfy the logical conditions $(\overline{\mathrm{VF}})\ (\overline{\mathrm{VFE}})\ (\mathrm{SFE})\ (\overline{\mathrm{SFL}})$, and differ only in the operation of the "two" vs. "seven" detector circuit 27. To establish the initial conditions, the circuit is completed through the normal positions of the armatures $K_{4b}$, $K_{2b}$, and $K_{6c}$, and the actuated armature $K_{3b}$. The final decision is made by the position of the armature $K_{8b}$ which is controlled by the "two" vs. "seven" detector circuit 27. The detector circuit 27 provides a signal in response to occurrence of the vowel pattern for the "seven," as opposed to the "two."

*"Three"–"four" detection.*—Both the "three" and the

"four" spoken digits are characterized by weak frictional sounds preceding the machine syllable which establishes the time reference. These are the "th" and "f" sounds respectively. The "r" which terminates the "four" spoken digit does not result in the detection of a weak frictional sound. Accordingly, the logical conditions $(\overline{VF})$ (WFE) $(\overline{WFL})$ which are established by the normal positions of armatures $K_{4b}$ and $K_{5b}$ and the actuated position of armature $K_{2b}$ identify the initial logical relationships. The final determination is made by the operation of the "three" vs. "four" detector circuit 26, which actuates the $K_7$ relay mechanism whenever the vowel characteristic of a "four" is present, as contrasted to the vowel characteristic of a "three." When the armature $K_{7b}$ is in its normal position the condition $(3\text{–}\overline{4})$ is satisfied and the output signal which is provided is that which indicates that the "three" spoken digit has been recognized.

"*Five.*"—The machine syllable registration point of the spoken digit "five" is preceded and followed by the weak frictional "f" and "v" sounds. This is the only one of the spoken digits for which this condition applies, so that when the WFE and WFL conditions are indicated in the absence of voiced friction by the actuation of armatures $K_{2b}$ and $K_{5b}$ while armature $K_{4b}$ is kept in its normal position, the occurrence of the spoken digit "five" to the exclusion of the other digits of the vocabulary is indicated by an appropriate signal.

"*Six.*"—In the spoken digit "six" the voicing which occurs is preceded and followed by the strong frictional sounds "s" and "x," the "six" being the only spoken digit which contains both SFE and SFL. Accordingly, these logical conditions are satisfied by actuation of the relays coupled to the armatures $K_{3b}$ and $K_{6c}$. It should be noted that, in the presence of the SFE condition, the $\overline{WFE}$ condition is maintained by the interlock arrangement previously described in conjunction with FIG. 3.

"*Eight.*"—The characteristic vowel sound of the spoken digit "eight" is not preceded by a frictional sound, but is terminated by a strong frictional sound, namely the "t." The preliminary logical conditions of $(\overline{VF})$ $(\overline{WFE})$ $(\overline{SFE})$ are satisfied when the armatures $K_{4b}$, $K_{2b}$ and $K_{3b}$ remain in their normal positions. Completion of the recognition of the spoken digit "eight" is accomplished when the relay $K_6$ is actuated so as to switch the armature $K_{6b}$ to provide a complete circuit from the positive voltage source 40 to the output terminal on which the "eight" signal is represented.

As these decisions are made, during application of signals representing a spoken sound, no indication is provided until the presence of voicing is ascertained. At the transition to voicing, appropriate indications are made, in sequence as the signal representation of a word proceeds, until the word is completed and a final correct indication is given and held. This is therefore a real time system which does not require storage or delay. With the final indication the system locks until reset as described.

The advantages of such sound analyzing systems will readily suggest themselves to those skilled in the art. Because of the asynchronous time base which is employed, the registration and segmentation of meaningful intelligence is determined by the sounds themselves. A word is recognized, therefore, whether spoken slowly or quickly within wide limits. Through the use of concurrent measurement of the number of characteristic variable factors in speech, high reliability may be achieved even with an extremely large vocabulary. With an arrangement such as shown, systems in accordance with the invention have been constructed which have recognized the words of the chosen vocabulary when spoken by any of a number of persons having different voice characteristics. A specific system, described in conjunction with the various figures, acts to recognize the ten spoken digits as well as additional longer words.

It is extremely important to note that both reliability and vocabulary are materially enhanced by relatively small increases in the complexity of the equipment which is used. The six detector circuits which are shown permit unique identification of each of the ten spoken digits without material redundancy or extra equipment. They may be regarded as filter networks which are responsive to particular properties of the sounds which are represented by the electrical signals. If additional detector circuits are added, to test for other vowel or frictional characteristics than those mentioned above, so as to provide a new order of sound increments or specific discernible properties, the system accuracy will be improved because the extra sound increments will permit a check of the accuracy of the other determinations, while the system vocabulary will also be increased.

It may not at first impression be evident that each new sound increment which does not have an extremely limited application provides a many fold increase in the potential vocabulary of the system. Such an increase is nonetheless obtained, because the new sound increment may be combined with each of the other sound increments into a unique combination, it may be combined in different time relationships, and in machine syllable sequences of different lengths. Effectively, in the ideal theoretical case, in which each sound increment is unique and is fully useful wherever found, the presence of an additional sound increment causes an increase in the possible vocabulary by an exponential factorial increment instead of merely an algebraic or multiplicative increment. Thus, for this ideal case, the addition of a seventh sound increment would cause a change in the number of possibilities for the vocabulary of from $2^{6'}$ to $2^{7'}$.

It will also be appreciated by those skilled in the art that systems and methods in accordance with the present invention avoid the complexities of prior art systems and methods. To select any given characteristic phonetic unit and to construct a detection system which will operate reliably and rapidly for that phonetic unit is a costly and almost insurmountable process. By selecting characteristics of the sounds themselves and by choosing these as the basis for characterizing syllables, it is found that the circuitry which is utilized may be extremely simple while the chosen sound increments are definitely meaningful and useful in the identification of a given spoken word as against the other words of the chosen vocabulary. An aspect of the present invention is that there is no predetermined division of words. There is, in fact, virtually complete freedom from adherence to the concepts and units of phonetics, such as word syllables, phonemes and consonants. Instead, there are the sound increments such as frictional sounds, machine vowels, and the machine syllables which are controlled by the words themselves.

It has been noted in conjunction with the operation of the system that the detection of voicing is a prerequisite to the identification of any spoken word. The use of this prerequisite materially enhances reliability, because the voicing measurement which is used is extremely sensitive to humanly voiced speech but virtually impervious to mechanically generated noise. It has previously been thought that a detection of voicing with a reliability in excess of approximately 93% was virtually impossible of attainment using variations of the band ratio or format tracking techniques for example. Systems in accordance with the present invention, however, are capable of detecting voicing with an accuracy well in excess of 99%, and can detect voicing of extremely low energy levels even in the presence of relatively high levels of mechanically generated noise. Indeed the voicing measurement is virtually independent of "white" audio noise since the addition of an equal factor to each of the positive and negative envelopes does not change the numerical difference of the asymmetry.

The use of such an extremely reliable identification of the time base per word permits a number of other useful features. By using the onset of voicing as the time base, it is readily feasible to ignore the many and often subtle problems which are concerned with the points of actual initiation and termination of a spoken word. In the verbal expression of a word, some persons may perceptibly articulate before and after the word for an interval which is a considerable fraction of the total duration of the word. With a word which begins with the letter "s," for example, the word is not initiated abruptly but is preceded by what may be called a "ramp" of varying length. On the other hand, some regional accents strongly emphasize some terminating sounds, such as the final "g" in "ringing." With the present system, these registration and segmentation difficulties are obviated because the highly reliable voicing measurement is made, and the initial and terminating portions are related to it, so that it is immaterial whether extraneous unvoiced sounds are emitted at the initiation or termination of the word.

Figure 5:
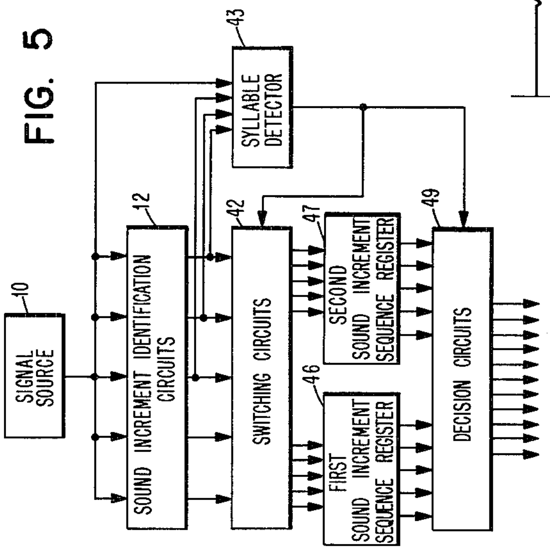
FIG. 5 is a block diagram representation of a system in accordance with the invention for recognizing words containing polysyllabic voicing.

The system may be readily extended to include a vocabulary of polysyllabic words. To be more precise, however, because of the distinction between phonetic and machine syllables, these will be referred to as poly-voiced words. A system for recognizing words of more than one machine syllable, as well as words having a single machine syllable, is shown in FIG. 5. As with the arrangements previously discussed, the electrical signals representative of spoken words to be identified are provided from a signal source 10 to sound increment identification circuits 12. Signals indicative of the detection of particular properties or sound characteristics in the input signals are provided from the sound increment identification circuits 12 to switching circuits 42 for selective application to either of a first or second sound increment sequence register 46 or 47. The sequence register 46 or 47 to which the signals are applied is determined for the switching circuits by a syllable detector 43 which is responsive to some or all of the sound increment identification circuits 12 as well as signals from the signal source 10. The syllable detector 43 may be a simple counter arrangement, to count selected machine syllables during an interval in which signals are provided from the signal source 10. In one arrangement, for example, a certain power level from the signal source 10 may gate "on" the syllable detector 43, which is then made responsive to the different sound increment indications provided from the sound increment identification circuits 12, so as to count successive vowel or voiced sounds and also, if desired, different frictional and vowel characteristics. When the spoken word is found to contain a second transition to a voiced sound, the syllable detector 43 may actuate the switching circuits 42 so as to utilize a different sound increment sequence register 46 or 47.

The sound increment characteristics to which the syllable detector 43 may be made responsive are dependent upon the vocabulary which is to be recognized. In the present instance, signals from the identification circuits 12 are provided through the switching circuits 42 to the first sound increment sequence register 46 for the first machine syllable (the first vowel sound with associated frictional sounds) of a spoken word. On detection of the next machine syllable of a poly-voiced word, the switching circuits 42 are operated to provide the signals from the detectors to the second sound increment sequence register 47. Concurrently, the decision circuits 49 are conditioned by the syllable detector 43 so as to select the proper word in accordance with the patterns provided by both the first and second sound increment sequence registers 46 and 47. Operation of the system with a single machine vowel sound in the spoken word is therefore the same as the arrangement previously described in conjunction with FIGS. 2, 3 and 4. On the occurrence of a second machine vowel sound, the second vowel sound and succeeding incremental sounds are registered in the second sound incremental sequence register 47. Both of the sequence registers 46 and 47 control the operation of the decision circuits 49.

Those skilled in the art will recognize that a number of alternatives may be employed in systems for recognizing poly-voiced words in accordance with the invention. Different sound increment sequence registers need not be employed, for example, but instead the information contained in the sequence register at the termination of a first machine syllable may be shifted out into a separate storage and the same sound increment sequence register may be utilized for the next succeeding machine syllable. The switching and logical decision functions which are performed by the sound increment sequence register in the decision circuits may also be provided in a variety of other ways.

The voicing detector circuit 24 of the arrangement shown in FIGS. 2 and 3 performs an important function in arrangements in accordance with the present invention. While a number of circuits may be utilized for this purpose, a particularly advantageous arrangement is shown in schematic form in FIG. 6. This circuit utilizes the asymmetric characteristic of the voiced part of speech.

In the voicing detector circuit 24, the input signals which are provided are principally signals representative of spoken sounds of the human voice. They include voicing sounds, but also, frictional sounds and mechanically generated or other forms of noise. With voicing, however, the signals are generally complex waves having the general characteristics of damped oscillations. The input signals are provided in this circuit to a phase shifter circuit which passes all frequencies of interest. Application of the signals is made at the base electrode of a transistor 50 whose collector and emitter are coupled to direct current voltage sources 52, 53 of appropriate polarity for the conductivity type of the transistor through a pair of substantially equal resistors 56, 57. Phase shifted output signals are derived through adjustment of a passive network coupled to the output terminals of the transistor 50, the passive network consisting of an adjustable resistor 60 which is coupled to the transistor emitter, and a capacitor 61 which is coupled to the transistor collector. The output signals from the phase shifter are then coupled through a transformer 63 to circuit elements which respond to the asymmetric characteristics.

The signals from the transformer 63 are provided in parallel to a pair of oppositely poled diode detectors 65, 66. A positively poled diode detector 65 passes signals of positive polarity to a peak charging circuit consisting of a shunt capacitor 68 having one plate connected to ground, and a series resistor 69 which is coupled to a junction point 70. In symmetrical fashion, another peak charging circuit is coupled to receive signals from the negatively poled diode detector, this integrating circuit also including a shunt capacitor 73 having a plate connected to ground and a series resistor 74 which is coupled to the junction point 70. The peak charging circuits are matched, as are the diode detectors 65 and 66, so that signals of like magnitude but opposite polarity applied to the diode detectors 65 and 66 have effects of like magnitude at the junction point 70. The time constant of the integrating circuits is selected to be of the order of 200 milliseconds, which is determined by typical syllabic rates for the words in the vocabulary. Signals appearing at the junction point 70 are applied through a final smoothing capacitor 77 to output terminals for the voicing detector circuit 24.

The asymmetric characteristic of the voiced part of speech arises from the manner in which sound is generated by the vocal cords and modulated by the person who is speaking. The vocal cords are activated so as to provide roughly triangular power distribution with time, and the damped oscillatory wave modulates this distribution. The result is an unequal relationship between the positive power peak of the sound wave, relative to the reference axis, and the negative power peak of the sound wave, relative to the reference axis. Although the inequality or asymmetry may vary with time, for a given voicing sound, it may be considered that some asymmetry invariably exists for voicing sounds.

Figure 7:
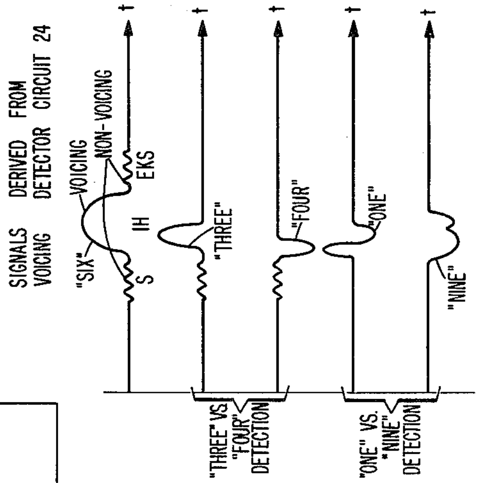
FIG. 7 is a diagram of waveforms arising in the operation of the circuit of FIG. 6 with different signals and for different adjustments.
Figure 6:
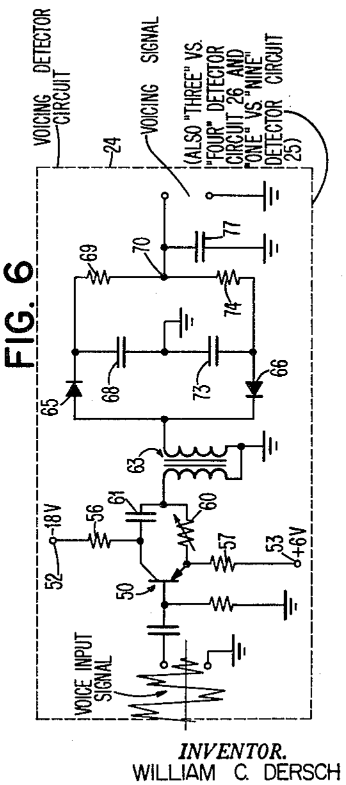
FIG. 6 is a schematic diagram of a voicing detector circuit which may be employed in systems in accordance with the invention, and which may also be employed for distinguishing "three" and "four" machine vowel sounds, and "one" and "nine" machine vowel sounds.

The voicing detector circuit 24 of FIG. 6 accurately detects the existence of voicing by measuring the difference between the peak of the positive envelope of the input signals and the peak of negative envelope of the input signals. The phase shift introduced into the signals passed through the phase shifter circuit is determined by the setting of the adjustable resistor 60. Specific uses of the phase shift are discussed below. Through the action of the peak charging circuits, the relative peaks of the signal components of opposite polarity which occur within a typical syllabic interval are stored over a sufficient interval and are made available for comparison. Where these peak signals are relatively equal, the potential of the circuit junction 70 is effectively unchanged. Where voicing exists, however, its asymmetric characteristic causes a difference between the signal contributions of opposite polarity, shifting the potential level of the circuit junction 70 correspondingly. Whether the potential at the output terminal shifts positively or negatively, therefore, the presence of a potential other than the equilibrium potential indicates that voicing has been detected. This is indicated by the illustrative waveform labeled "voicing" in FIG. 7, which shows an appreciable amplitude variation for the voiced part of the spoken digit "six."

Although the circuit is relatively simple, it has been found that it permits voicing to be detected with great accuracy. In addition, as described below, it permits further identification of the nature of a voicing characteristic and discernment of different types of machine vowel sounds from each other. Mechanical disturbances, background noise and other types of random sounds typically have symmetrical characteristics and are effectively completely rejected by the circuit. Better than 99% reliability in the detection of voicing has been found feasible with this circuit. Furthermore, the circuit is also responsive to sounds, such as the "z" sound, which partially involve voicing and partially involve a frictional effect.

In the arrangement of FIG. 6, the value of adjustable resistor 60 is selected to be appreciably greater, at a minimum, than the value of either of the substantially equal resistors 56, 57 which are in series with the transistor 50. With this arrangement, an appropriate phase shift insures that the complex voicing wave will cause the voicing detector circuit 24 consistently to provide an output of a selected polarity. Like results may also be insured through use of an appropriate band pass filter instead of phase shift.

Variations of the phase shift (by change of the adjustable resistor 60) or variation of the band pass, however, permits modification of the complex wave of different voicing sounds in such fashion as to distinguish the different voicing sounds. When a different phase shift is introduced into the complex wave of a particular voicing sound, the general character of a damped oscillatory wave is not affected, but the location and amplitude of the peaks may be strongly affected. A different voicing sound may not be appreciably affected, or may be affected in a different manner. Such variations in response are in fact predictable and consistent for known conditions, and are here utilized by changing of the adjustable resistor 60. For one setting of the resistor 60, for example, "three" vs. "four" detection is readily achieved, because the "three" signal causes generation of a positive pulse output signal whereas the "four" signal results in a pulse of opposite polarity. For a different adjustment of the resistor 60, a "one" results in an output signal formed by a positive, then a negative pulse, whereas a "nine" results in solely a negative pulse, of longer duration.

Detector circuits 25 and 26 differentiate between the numbers "one" and "nine" and "three" and "four," respectively, and utilize different arrangements of phase shifters. Detector circuit 27 differentiates between the numbers "two" and "seven" and utilize an "envelope sum," that is, a band ratio type circuit. Depending upon the filtering or phase shift which is used and the machine vowel sound which is being pronounced, the output signal from the voicing detector circuit may form a single positive pulse, a single negative pulse, a positive pulse followed by a negative pulse, or a negative pulse followed by a positive pulse. Appropriate circuits may be utilized to identify each of these conditions. Through the use of averaging circuits, single positive and negative pulses may be distinguished from the sequences in which both positive and negative pulses are present. Unidirectional circuit elements may then permit the positive pulses to be distinguished from the negative pulses. Any of a number of circuits well known in the digital data processing arts may be employed for detecting the condition in which a pulse of one polarity is followed by a pulse of the opposite polarity. As one example, a positive pulse at the output terminals of the voicing detector circuit may be utilized to trigger a one shot multivibrator which generates a pulse having a duration longer than the expected interval within which the succeeding negative pulse will fall if one is to occur. The coincidence of the negative pulse and pulse from the one shot multivibrator therefore indicates that sequence has occurred in which the positive pulse is followed by the negative pulse. In order to conserve the amount of circuitry which is used, the output terminals of the various voicing detectors in the different vowel detector circuits may be coupled into a gating network which is set up to make the necessary decisions as to the vowels which have been identified.

Figure 8:
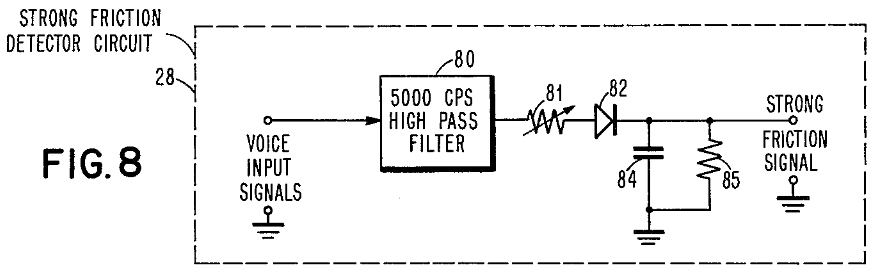
FIG. 8 is a schematic diagram of a strong friction detector which may be employed in systems in accordance with the present invention.

Strong friction detection circuits, such as the detector circuit 28 previously described, are known in the art and an example is shown in FIG. 8. In such a circuit, voice input signals are provided to a high pass filter 80 which is usually arranged to pass signals in excess of 5000 cycles per second. Signals which are passed by the filter 80 are applied through an adjustable resistor 81 to a diode detector 82. Signals which are passed through the diode detector 82 are integrated by a parallel capacitor 84 and resistor 85 which are coupled to ground, and then appear as signal variations on output terminals.

A strong friction detector circuit 28 of this type makes effective use of the frequency distribution characteristics which are present in strong frictional sounds, but which are not present in other, weaker frictional sounds or in the vowel sounds. Because the signal which will be passed by the filter 80 and detector 82 and provided as an output signal after integration may vary quite widely, depending upon the speaker and the circumstances of expression of the strong frictional sound, it may be desired to employ a threshold circuit coupled to the output terminals of the detector circuit 28, for more accurate recognition of the existence of the strong frictional sounds.

The detection of weak frictional sounds is a considerably more sensitive problem than the detection of strong frictional sounds alone. The amount of energy generated above 5000 c.p.s. when speaking the "f" and "v" sounds of the word "five" is materially less than with strong frictional sounds and in fact little different from the "a" sound as pronounced in the word "ate." A strong friction detector as previously described is accordingly not sufficiently reliable for weak frictional sounds, and in any event it is desirable to be able to distinguish between strong and weak frictional sounds.

Figures 9, 10:
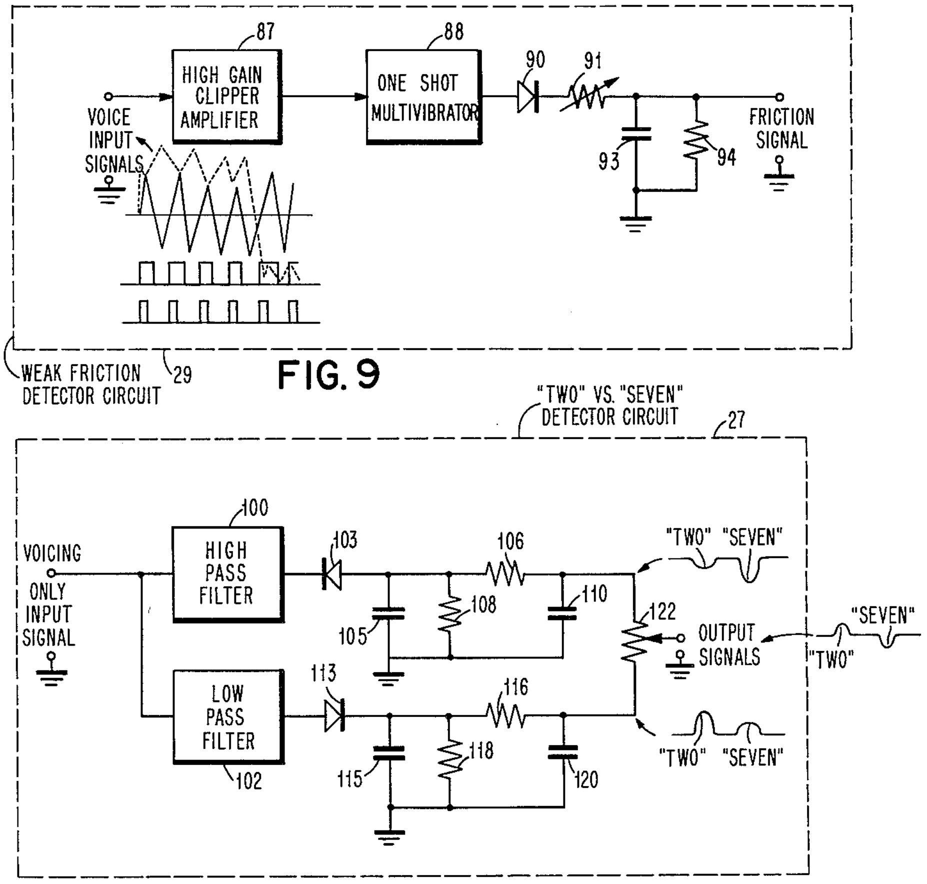
FIG. 9 is a schematic diagram of a detector circuit for detecting weak frictional sounds which may be employed in systems in accordance with the present invention.
FIG. 10 is a schematic diagram of a detector circuit for distinguishing "two" and "seven" machine vowel sounds.

The arrangement of FIG. 9 provides the basis for detection of weak frictional sounds with high reliability. Voice input signals are provided to a high gain clipper amplifier 87 which provides a series of rectangular pulses having a time duration determined by certain characteristics of the voice input signal. Portions of the voice input signal which are of positive polarity tend to drive the high gain clipper amplifier 87 to saturation, thus resulting in the generation of a rectangular pulse which commences with the zero crossing at which the voice input signal initially goes positive, and terminates at the zero crossing at which the voice input signal goes negative. The leading and trailing edges of these rectangular pulses thus correspond to the zero crossing points of the voice input signals. Signals from the clipper amplifier 87 are applied to a one shot multivibrator 88 which is triggered by either the leading or trailing edge (here the leading edge) of the rectangular pulses so as to provide a pulse of a selected duration for each leading or trailing edge.

A measure of the zero crossings which occur in the voice input signals in a selected time interval is obtained by a coupled circuit which includes a diode rectifier 90, an adjustable resistor 91, and an integrating and low pass filter circuit which includes a shunt capacitor 93 and shunt resistor 94 combination which is coupled to ground. Signals of the selected polarity which are passed by the diode rectifier 90 and suitably attenuated for the desired output signal level in the adjustable resistor 91 are averaged over a selected interval in the passive circuit consisting of the capacitor 93 and resistor 94. Because only pulses of standard duration are provided from the one shot multivibrator 88, the number of these pulses which occur through these selected time intervals determines the potential level of the output signal from the weak friction detector circuit 29. Marked deviations from the quiescent potential level of the output terminal indicate the existence of a weak friction sound representation in the voice input signal.

The arrangement of FIG. 9 may also employ a threshold circuit coupled to the output terminals in order to more accurately distinguish useful signal indications from those resulting from noise, other sounds and random effects. While the weak friction detector circuit 29 which has been described is also responsive to strong friction, the existence of weak friction alone may be indicated through the use of an interlock or gating arrangement as previously described.

The functioning of the weak friction detector circuit 29 is based upon a characteristic which distinguishes the weak frictional sounds from vowel sounds which are otherwise similar. The weak frictional sounds may be said to be noise-like in character. That is, they do not essentially have frequency components but vary rapidly, with many positive and negative spikes. In simplified form, they may be represented by the solid line waveform shown for the voice input signals in FIG. 9. The machine vowel sounds, however, may be defined as complex speech waves having a fundamental frequency of less than about 400 c.p.s. While this complex wave will have many slope reversals, there are far fewer changes at the reference axis, so that the number of zero crossings occurring within a given time interval are far less. In simplified form, the complex waveform representative of a vowel sound such as the "a" in the word "ate" may be represented by the dotted line waveform shown in FIG. 9.

For the weak frictional sounds, therefore, the high gain clipper amplifier 87 provides a considerable number of individual rectangular pulses bearing a given time interval, and fewer though longer pulses for vowel sounds. The one shot multivibrator 88 accordingly generates many more pulses for the weak frictional sounds than for the vowel sounds, and the change in the potential at the output terminals of the weak friction detector circuit 29 is far greater for the weak frictional sounds than for the vowel sounds.

Identification of the spoken "two" as compared to the "seven" may be achieved by a detector circuit 27 such as is shown in FIG. 10. The "voicing only" input signal, gated in from the voicing detector circuit, is applied to two different signal channels, one of which includes a high pass filter 100 and the other of which includes a low pass filter 102, both filters operating in the vowel frequency range, i.e., below about 3,000 c.p.s. Signals accepted by the high pass filter 100 are applied through a negatively poled diode 103 to a peak charging and integrating circuit consisting of a shunt capacitor 105, a series resistor 106, a shunt resistor 108 and a smoothing capacitor 110. In the other signal channel, signals accepted by the low pass filter 102 are applied through a positively poled diode 113 to elements 115, 116, 118 and 120 arranged in a peak charging and integrating circuit. Signals from both channels are additively combined in a resistor 122 having a movable contact coupled to the output terminals of the detector circuit 27. Because of the additive combination of the signals the corresponding elements in the two channels are selected to have substantially like characteristics.

With the detector circuit 27 of FIG. 10 arranged as shown, different frequency and asymmetry properties occurring in the spoken "two" and "seven" result in the generation of unique output signals. The positive going low frequency components of the spoken "two," for example, produce a peak of measurably greater absolute value than the negative peak derived from the high frequency components. By combining these two signals to alter the potential at the contact on the resistor 122, the circuit 27 provides a positive output pulse which identifies the spoken "two" in distinction to the spoken "seven." The opposite situation obtains, as far as the relative magnitudes of the positive and negative peaks are concerned, when the spoken "seven" is applied, so that the "seven" is definitely identified by a negative output pulse.

Methods of analyzing sounds in accordance with the present invention may be seen to involve concurrent measuring for the occurrence of selected, highly precise characteristics and properties which are presented by the sounds themselves. These characteristics may relate to frequency, but more likely relate to specific energy or time varying relationships which may readily be identified by relatively simple electronic circuits. Meaningful patterns in the sound are identified by the time sequence in which the particular characteristics are detected. The analysis is made in real time, at rates and in steps controlled by the different sound increments. As applied to sound recognition, the steps of methods in accordance with the invention utilize the identification of voicing to determine that a word has been spoken, and also to establish a time registration point or reference to which other identifiable characteristics in the signal patterns representing the spoken word may be related in time. From this, machine syllables are identified. Full identification of spoken words is made by the patterns in which various sound increments, including frictional sounds and machine vowel sounds, occur in relation to the machine syllables.

It will be recognized that in both systems and methods in accordance with the invention the manner in which final decisions are made, once patterns of sound increments have been identified, may be widely varied. A "best match" system may be used, for example, to determine which of a group of standard patterns most closely corresponds to a pattern established by a word. The signals from the various detectors may also be weighted, in accordance with their inherent accuracy and significance, so as to further minimize inaccuracies. These and other techniques, such as the use of additional sound increments for error checking, are useful in determining the fact that a word is unidentifiable, as well as in permitting very similar patterns to be distinguished.

While there have been described above and illustrated in the drawings various systems and methods for analyzing sounds and recognizing spoken words in accordance with the invention, it will be appreciated that various elements and steps may be modified or completely supplanted by the use or substitution of other known elements or relationships. Accordingly, the invention should be considered to include all modifications, variations and alternative forms falling within the scope of the appended claims.

I claim:

1. A system for the analysis of sound including the combination of means responsive to the sound and providing signals representative of the sound, a number of circuit means, each individually responsive to a different selected time varying property of the signals, the different properties occurring as successive incremental parts of the sound being analyzed and selection circuit means controlled by the time of operation of the different individual circuit means and responsive to both the nature and the relative times of occurrence of the selected time varying properties for identifying particular manifestations in the sound as the sound occurs.

2. A system for the analysis of sound including the combination of means for providing signal representations of the sound, a number of identification circuit means coupled to receive the signal representations concurrently, each of the identification circuit means being individually responsive to a different selected time varying property in the signal representations, and selection circuit means coupled to the identification circuit means and responsive to the time varying properties which occur and their times of occurrence relative to each other for identifying particular manifestations in the sound being analyzed.

3. A system for the analysis of sound including means responsive to electrical signal representations of the sound for detecting the occurrence of a first selected characteristic, a number of concurrently operable means responsive to electrical signal representations of the sound for detecting the occurrence of other and different selected individual characteristics, and means responsive to the detection of the various selected characteristics for relating the characteristics in time to the detection of the first selected characteristic.

4. A system for the analysis of sound to detect the occurrence of particular manifestations in the sound including the combination of means responsive to the sound for detecting the occurrence of a first selected characteristic, means responsive to the sound for detecting the occurrence of other selected individual characteristics than the first, sequence register means responsive to the detection of the various characteristics for relating the characteristics in time to the first selected characteristic, and means responsive to the sequence register means for identifying particular manifestations which have occurred in the sound.

5. Means for identifying spoken words including means responsive to signal representations of the spoken words for detecting the occurrence of asymmetric amplitude characteristics in the signal representations of the spoken words, means responsive to the signal representations of the spoken words for detecting the occurrence of selected time varying characteristics in the spoken words, and means responsive to both of the means for detecting for identifying particular spoken words by the sequence in which the different characteristics are detected.

6. A system for recognizing spoken words including a plurality of detector means, each individually responsive to a different selected sound increment in spoken words, means coupled to the detector means for establishing a time base controlled by changes in the different sound increments, and means responsive to changes in the sound increments relative to the established time base for identifying particular words by the sequence of the different sound increments.

7. A system for recognizing spoken words from electrical signal representations thereof including a plurality of detector means, each individually responsive to a different selected spoken sound increment in the electrical signal representations, means coupled to the detector means for establishing a time registration point for the spoken words, and means coupled to the detector means and responsive to the selected sound increments for recognizing particular words by the sequence of sound increments related to the time registration point.

8. A machine for recognizing spoken words from electrical signal representations thereof including means responsive to the electrical signal representations for identifying machine vowel sounds, means responsive to the electrical signal representations for identifying sound increments other than the machine vowel sounds, means responsive to the identification of machine vowel sounds for establishing machine syllable time registration points, and means responsive to the machine syllable time registration points and the identification of other sound increments for establishing sequences to recognize spoken words.

9. A system for recognizing spoken words including the combination of detector means responsive to selected sound increments represented by particular time varying characteristics of the words, means coupled to the detector means for establishing a time base controlled by the sound increments and referenced to a particular selected one of the sound increments, means responsive to the sequence in which the different sound increments occur relative to the time base for establishing logical conditions by which words may be identified, and means responsive to the logical conditions for identifying particular words which have occurred in the spoken words.

10. A speech recognition system including means responsive to one selected characteristic of spoken sounds for establishing a word time base, a plurality of means responsive to spoken sounds for identifying other selected sound characteristics, each of said plurality of means being individually responsive to a different other selected sound characteristic, and means responsive to the word time base and the identification of the other selected sound characteristics for recognizing words by the time distributed sequence of the selected sound characteristics.

11. A speech recognition system including means responsive to the occurrence of voicing in spoken sounds for establishing a word time base, a plurality of means responsive to spoken sounds for identifying selected sound increments, each of said plurality of means being individually responsive to a different selected spoken sound characteristic, and means responsive to the identified sound increments and the word time base for recognizing specific words from the time distributed sequence of the sound increments relative to the word time base.

12. A speech recognition machine including means for providing electrical signal representations of spoken words, means responsive to the electrical signal representations for identifying voicing in the spoken words, means responsive to the electrical signal representations for identifying friction in the spoken words, means responsive to the identification of voicing for establishing a machine syllable time base for a spoken word, means responsive to the identification of friction for relating the occurrence of friction in time to the machine syllable time base, and means responsive to the sequential relationship of friction to the machine syllable time base for recognizing particular spoken words.

13. A speech recognition system including the combination of means responsive to spoken sounds for identifying voicing, means responsive to spoken sounds for identifying frictional characteristics, means responsive to spoken sounds for identifying particular machine vowel characteristics, means responsive to the identification of voicing and frictional characteristics for relating the frictional characteristics in time to the voicing, and means responsive to the time relationship of the frictional characteristics to the voicing, and to the identification of the machine vowel characteristics, for identifying particular words occurring in the spoken sounds.

14. A speech recognition system including the combination of means responsive to spoken sounds for identifying voicing, means operating concurrently with the means for identifying voicing and responsive to spoken sounds for identifying different frictional sound characteristics, means operating concurrently with the means for identifying voicing and responsive to spoken sounds for identifying different machine vowel characteristics, sound sequence register means responsive to the identification of voicing and the identification of different frictional sound characteristics for establishing sound sequences using the occurrence of voicing as a time base and relating the different frictional sound characteristics in time to the time base, and decision circuit means responsive to the identification of different vowel characteristics in the operation of the sound sequence register means for identifying particular spoken words.

15. A speech recognition system including the combination of means providing signal representations of spoken words, a voicing detector circuit responsive to the signal representations, a strong friction detector circuit responsive to the signal representations, a weak friction detector circuit responsive to the signal representations, a "three" versus "four" vowel detector circuit responsive to the signal representations, a "two" versus "seven" vowel detector circuit responsive to the signal representations, a "one" versus "nine" vowel detector circuit responsive to the signal representations, sound sequence register means responsive to the identification of the voicing and the weak and strong frictional sounds for establishing an asynchronous time base for each machine syllable of a word which is determined by the transition of the signal representations to voicing and for relating in time the occurrence of the different frictional sounds to the asynchronous time base, and decision circuit means coupled to the sound sequence register means and the means for identifying the different vowel characteristics for selecting specific spoken words which have occurred.

16. The method of analyzing sounds to determine the occurrence of meaningful sound patterns which includes the steps of concurrently testing for the occurrence of selected time varying characteristics, and establishing a sequence of the selected different time varying characteristics related in time to the occurrence of a specific one of the characteristics, the sequence being controlled in time by the occurrence of the characteristics themselves.

17. A method of analyzing sounds to detect meaningful patterns in the sounds which include the steps of concurrently measuring the time varying characteristics of electrical signals representative of the sounds to detect the occurrence of different selected characteristics, defining a time base with a selected one of the different selected characteristics, forming a sound increment time sequence from the different detected sound characteristics as related to the time base, and detecting the occurrence of meaningful sound patterns from the existence of predetermined sound increment time sequences.

18. The method of recognizing speech which includes the steps of identifying the onset of a specific incremental sound characteristic in speech to provide a time base, individually identifying other incremental sound characteristics in speech, relating the other incremental sound characteristics in time to the time base, and indicating the presence of particular spoken words from the time sequence of the incremental sound characteristics.

19. The method of recognizing spoken words which includes the steps of detecting the occurrence of voicing in spoken words, detecting the occurrence of frictional sounds in spoken words, establishing machine syllable sequences utilizing the detection of voicing and frictional sounds, and identifying particular spoken words from the machine syllable sequences.

20. A method of identifying spoken words containing multiple voicing which includes the steps of detecting successive individual occurrences of voicing in the spoken words, detecting successive individual occurrences of particular frictional sound characteristics in the spoken words, relating the particular frictional sound characteristics in time to the voicing sound to which they are most closely adjacent in time, and identifying the occurrence of particular spoken words from the machine syllable sequences.

References Cited by the Examiner

UNITED STATES PATENTS

| | | | |
|---|---|---|---|
| 2,098,956 | 11/37 | Dudley | 179—1 |
| 2,183,248 | 12/39 | Riesz | 179—1 |
| 2,243,527 | 5/41 | Dudley | 179—1 |
| 2,646,465 | 7/53 | Davis et al. | 179—1 |
| 2,691,137 | 10/54 | Smith | 179—1 |
| 2,921,133 | 1/60 | Kalfaian | 179—1 |
| 2,928,902 | 3/60 | Vilbig | 179—15.55 |
| 2,971,057 | 2/61 | Olson et al. | 178—31 |
| 2,971,058 | 2/61 | Olson et al. | 178—31 |
| 3,037,077 | 3/62 | Williams et al. | 179—1 |

ROBERT H. ROSE, *Primary Examiner.*

L. MILLER ANDRUS, *Examiner.*

UNITED STATES PATENT OFFICE
CERTIFICATE OF CORRECTION

Patent No. 3,198,884 August 3, 1965

William C. Dersch

It is hereby certified that error appears in the above numbered patent requiring correction and that the said Letters Patent should read as corrected below.

Column 7, line 32, for "$K_1$" read -- $K_{1a}$ --; column 9, line 70, for "vertified" read -- verified --; column 21, line 43, strike out "different" and insert the same after "selected" in lines 41 and 42, same column 21.

Signed and sealed this 26th day of April 1966.

(SEAL)
Attest:

ERNEST W. SWIDER
Attesting Officer

EDWARD J. BRENNER
Commissioner of Patents